(12) United States Patent
Sinclair

(10) Patent No.: US 7,577,679 B2
(45) Date of Patent: Aug. 18, 2009

(54) TECHNIQUES FOR EXTENDING DATABASE DATE STATISTICS

(75) Inventor: Paul Sinclair, Manhattan Beach, CA (US)

(73) Assignee: Teradata US, Inc., Miamisburg, OH (US)

( * ) Notice: Subject to any disclaimer, the term of this patent is extended or adjusted under 35 U.S.C. 154(b) by 249 days.

(21) Appl. No.: 11/648,331

(22) Filed: Dec. 29, 2006

(65) Prior Publication Data

US 2008/0162416 A1    Jul. 3, 2008

(51) Int. Cl.
G06F 17/00    (2006.01)

(52) U.S. Cl. .................................... 707/102; 707/104.1

(58) Field of Classification Search ....................... None
See application file for complete search history.

(56) References Cited

U.S. PATENT DOCUMENTS

| | | | |
|---|---|---|---|
| 5,778,350 A * | 7/1998 | Adams et al. | 707/1 |
| 6,253,199 B1 * | 6/2001 | Wakio et al. | 707/3 |
| 6,360,214 B1 | 3/2002 | Ellis et al. | |
| 6,389,430 B1 | 5/2002 | Parker | |
| 6,801,903 B2 | 10/2004 | Brown et al. | |
| 6,847,978 B2 | 1/2005 | Ellis et al. | |
| 2003/0088579 A1 | 5/2003 | Brown et al. | |
| 2004/0034643 A1 | 2/2004 | Bonner et al. | |
| 2004/0193629 A1 * | 9/2004 | Mozes | 707/100 |
| 2005/0065911 A1 | 3/2005 | Ellis et al. | |
| 2005/0108199 A1 * | 5/2005 | Ellis et al. | 707/2 |
| 2005/0262158 A1 | 11/2005 | Sauermann | |
| 2006/0112093 A1 | 5/2006 | Lightstone et al. | |
| 2006/0149695 A1 | 7/2006 | Bossman et al. | |
| 2006/0218128 A1 | 9/2006 | Muras | |
| 2007/0094062 A1 * | 4/2007 | Tracy et al. | 705/8 |

* cited by examiner

Primary Examiner—Uyen T. Le
(74) Attorney, Agent, or Firm—Schwegman, Lundberg, Woessner

(57) ABSTRACT

Techniques for extending database date statistics are provided. A data dictionary houses existing date statistics for information housed in a column of a database table. The existing statistics housed in the data dictionary are used to project estimated statistics for the column for a target date that is not yet represented in the data dictionary and the data dictionary is updated with the estimated statistics.

14 Claims, 3 Drawing Sheets

TECHNIQUES FOR EXTENDING DATABASE DATE STATISTICS

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example source code as described below and in any drawings hereto: Copyright© 2006, NCR Corp. of Dayton, Ohio—All Rights Reserved

FIELD

The invention relates generally to database technology and more particularly to techniques for extending database date statistics.

BACKGROUND

Enterprises are increasingly capturing, storing, and mining a plethora of information related to communications with their customers. Often this information is stored and indexed within databases. Once the information is indexed, queries are developed on an as-needed basis to mine the information from the database for a variety of organizational goals: such as planning, analytics, reporting, etc.

In fact, many enterprises today have extremely large databases with frequent and voluminous transactions. For example, consider a large retail establishment that has updates for millions of transactions a day to its central database from a plurality of regional databases.

These large databases also process a variety of enterprise operations, which may be time critical to the enterprise, such as reports, analytics, and/or even complex database mining queries. Large databases with many transactions typically require optimization mechanisms to ensure that operations are efficiently processed in a timely fashion and that resources of the database (memory, storage, processors) are properly loaded and balanced. To do this, optimization services may inspect operations and a current state of the database and then develop plans to process the operations. The optimization service typically relies on gathered (sometimes referred to as collected) statistics about the database and its information when devising plans.

The gathered statistics are produced by statistics gathering services. These services determine a total number of rows, histograms for the values of columns, etc. The statistics gathering services may take a considerable amount of time to process and consume considerable resources to produce a full set of statistics for the database.

Moreover, plans developed by optimizing services will be skewed if the statistics of the database are not properly updated to reflect a current state of the database. However, to acquire current statistics the database may be have to be unduly loaded by the processing of the statistics gathering services, and the plans of the optimizing service delayed until the processing of the statistics gathering services complete.

Of particular concern are statistics on date columns. Columns with other data types may not become out-of-date as quickly as date columns. For instance, the amount of sales of one item may vary somewhat from one day to the next but probably not enough to significantly affect the statistics—these statistics may only need to be re-gathered once a week or even less often. However, for a date column, especially for the transaction date column, goes from zero rows with that value into the millions after the data for that day is loaded. The statistics on these date columns needs to re-collected at least once a day after the load, if not more often.

It becomes a catch 22 scenario for database administrators of large transactional database environments. To have optimal plans up-to-date statistics for the database are need and yet up-to-date statistics require gathering the statistics after loading new data to the database and delaying the optimizer, which defeats the very benefits of the plans produced by the optimizer.

Previous techniques have the optimizer extrapolate date statistics if the date statistics were gathered at earlier time. This requires changing the optimizer that is part of a large database system and waiting until that version of the optimizer is released. This does not provide relief for users of the current database release. Moreover, when the release is available, the optimizer will have its method of extrapolating data statistics. While this method may be suitable for a wide variety of date columns, there may be cases where a different extrapolation method is more appropriate. In those cases, a user would have to re-gather statistics to obtain up-to-date statistics since they could not change the extrapolation method.

Thus, it can be seen that a more easily configurable and more efficient mechanisms for generating and using database date statistics are needed.

SUMMARY

In various embodiments, techniques for extending database date statistics are presented. According to an embodiment, a method for extending database date statistics is provided. A request to extend statistics is received for a date column of a database table. A last date is determined when existing statistics were gathered for the column and updated to a database dictionary information for the column. A subset of statistics is gathered from column's statistics. Estimated date statistics are projected from the subset of statistics. The procedure to do this is modifiable by the user so that the user can customize the extrapolation method (what previous subset of the column's statistics are examined, the algorithm for the extrapolation, etc.). A procedure to obtain the column's statistics, validate the statistics, and write back the updated statistics is demonstrated along with some methods to do the extrapolation.

DETAILED DESCRIPTION

Figure 1:
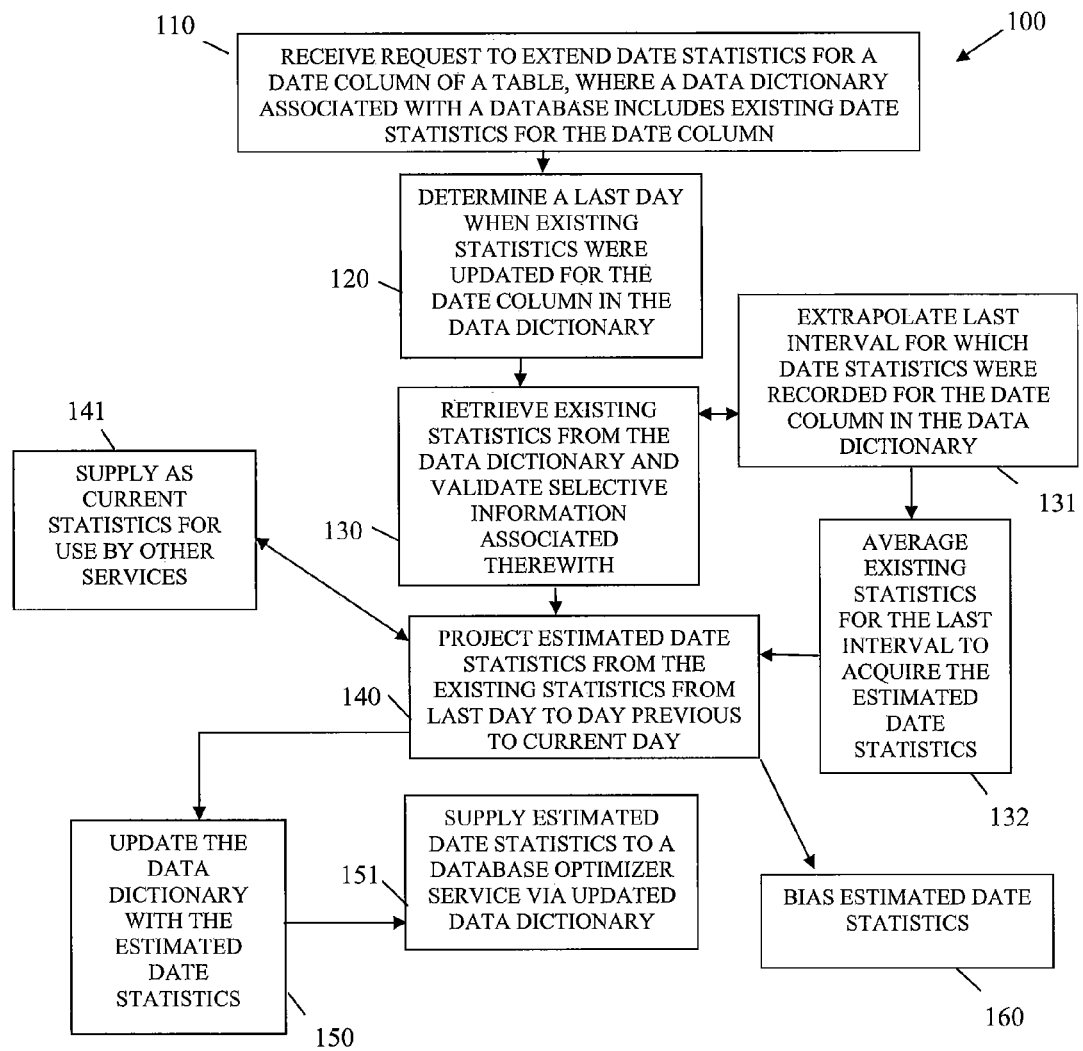
FIG. 1 is a diagram of a method for extending date statistics, according to an example embodiment.

FIG. 1 is a diagram of a method 100 for extending date statistics, according to an example embodiment. The method 100 (hereinafter "date statistics extender service") is implemented in a machine-accessible or computer-readable medium as instructions that when executed by a machine (processing device) performs the processing depicted in FIG. 1. Moreover, the date statistics extender service implementation can be modified by the user to customize the extrapolation method. Moreover, the database statistics extender service and its implementation is optionally accessible over a network so that invoking it or modifying it can be done without access to the database system's implementation. The network may be wired, wireless, or a combination of wired and wireless.

A "database" as used herein is a relational database, or a collection of databases organized as a data warehouse. According to an embodiment, the database is a Teradata® product or service distributed by NCR Corporation of Dayton, Ohio.

The database includes a variety of enterprise information organized in tables. A table includes a variety of rows and columns. The rows and columns are defined via a table definition or schema.

The database includes a variety of services such as an optimizer. The optimizer develops plans for operations that are to execute against the database. The optimizer relies on statistics gathered for columns of tables and information housed in a database's data dictionary that describes tables and other objects in the database. These statistics are gathered periodically and are often date specific. The statistics of the database are also housed in a database's data dictionary. The data dictionary is accessed by the optimizer when plans are developed for queries and other requests to the database.

It is within this context that the processing associated with the date statistics extender service is now described in detail with reference to the FIG. 1.

At 110, the date statistics extender service, receives a request to extend statistics for a date column of a table. The data dictionary includes date statistics for the column (if not, the statistics must be first gathered by the user using the statistics gathering services). The request is not to execute a statistics gathering service; rather the request is to extend the date statistics to depict current statistics by estimating statistics from prior statistics for the column.

At 120, the date statistics extender service determines when existing statistics for a specified date column of a table housed in the data dictionary were last updated to the data dictionary (either by a previous gather or extension). The statistics housed in the database may be organized by intervals, where each interval reflects a different range of dates for which the statistics were gathered. Thus, in some embodiments, the last interval may present the last range of dates and last set of existing statistics which were gathered for the date column.

At 130, the date statistics extender service retrieves the statistics for the date column from the data dictionary and validates the information (such as make sure the statistics version is one that the extender can handle, the statistics information is not corrupted, etc.). The various information in the statistics is extracted so that it can be use to extrapolate the statistics and then can the rebuild the updated statistics Thus, in an embodiment, at 131, the date statistics extender service may extrapolate based on the subset of time as the last interval (range of days) for which statistics were recorded for the column in the data dictionary; an interval represents a range of days (minimum and maximum), a day within the range with the most number of rows for the range, how many rows for that day, plus a total count of rows for the other days in the range.

At 132, the two row counts can be added and averaged for the days in the range to produce the estimated statistics, at 140, for one day.

At 140, the date statistics extender service projects estimated date statistics for the days between the last day in the prior interval up to the day previous to the current day. Note that this is extended up to the previous day since the current day's data has not finished loading (the day isn't over yet). Other embodiments may extend up to the current day or even beyond as appropriate for the particular column, or otherwise change the method of extending the statistics, as the procedure is user modifiable. This is a projection or estimation as to what the statistics for this new period might be or will likely be based on analysis of the subset of prior statistics, which produces the estimated statistics. The last interval is updated to extend the range of the interval to the day previous to the current day and the row count for the other days is increased by the amount estimated above. Also, the total row count and maximum value that are also kept in the statistics are updated. The update statistics for the column are written to the data dictionary and overwrite the previous statistics for the column. At 141, the estimated statistics may be used by services (including a subsequent invocation of the date extender service) as if it were the current statistics.

It is noted that a variety of techniques may be used to mine the statistics associated with prior intervals to produce or project the estimated statistics. Averaging is but one technique. Some example techniques and a specific implementation that may be used is produced and discussed below after the discussion of the FIG. 3.

In an embodiment, at 150, the date statistics extender service updates the data dictionary with the estimated statistics. The subsequent services that rely on and use the date statistics may then use the estimated statistics as if it were the gathered statistics. For example, at 151, the date statistics extender service may update, in the data dictionary, the statistics for a column with the estimated statistics. The optimizer services relies on the statistics (whether gathered or estimated) obtained from the data dictionary to develop plans for database operations that are to be processed against the database. The optimizer does not need to be aware of whether the statistics in the data dictionary for the column were gathered or estimated statistics.

In an embodiment, at 160, the date statistics extender service may also bias the estimated date statistics. This can account for a variety of situations and can using weighting or other forecasting algorithms to more accurately project the estimated date statistics.

The date statistics extender service can be used to intelligently extend date statistics associated with a column of a table, such that other processes or services can complete more efficiently and more accurately. It is noted, that at some configurable points in time, a database administrator may elect to run a statistics gathering service to update, in the data dictionary, the statistics for columns of a table with actual up-to-date statistics for the database. When this occurs, the estimated statistics are removed and updated with the gathered statistics.

It is also noted that although the date statistics extender service was discussed in terms of extending the database by multiple days, the usual case is run the extender at least daily. The date statistics extender service is capable of generating estimated statistics for more than one day so that, for example, in cases where a database gathering service does not process for several days due to a variety of reasons, such as holidays, upgrades, outages, etc., each missing day of statistics may be estimated using the techniques presented above with the date statistics extender service.

It is also worth noting that the date statistics extender service is a standalone service that is not dependent on any database optimizer service. This frees database optimizers to rely on plan generations for operations such that they are not convoluted with date statistic gathering or extension logic or related dependencies. Database optimizer services may not even be aware of the database statistics extender service and the estimated statistics that the database statistics extender service provides. The point is that the database optimizer services may process rapidly and unabated relying on the statistics (gathered or estimated) in the data dictionary that the database optimizer typically uses without any change to the optimizer.

Figure 2:
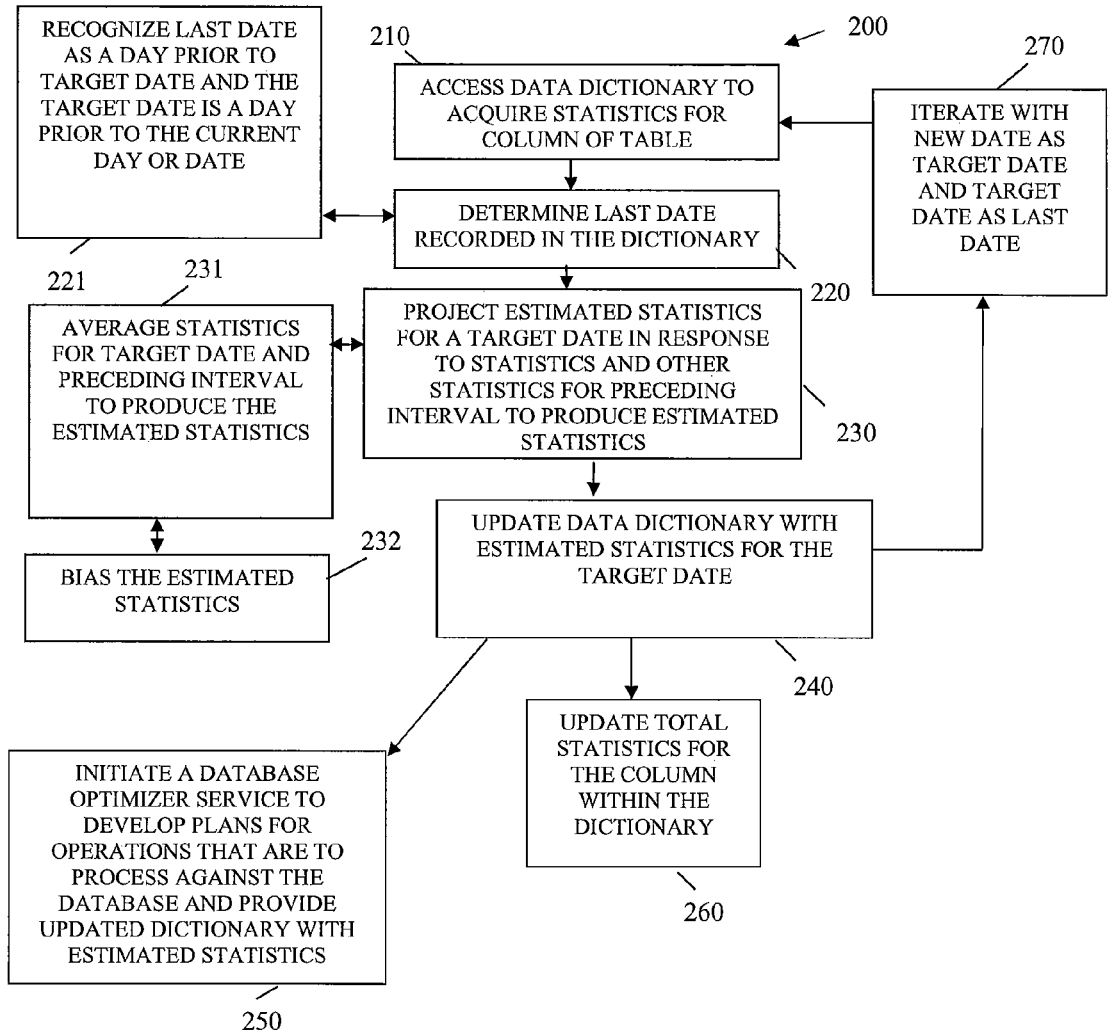
FIG. 2 is a diagram of another method for extending date statistics, according to an example embodiment.

FIG. 2 is a diagram of another method 200 for extending database date statistics, according to an example embodiment. The method 200 (hereinafter "statistics extension service") is implemented in a machine-accessible and readable medium as instructions that when executed by a machine performs the processing reflected in FIG. 2. The statistics extension service may also be accessible and modifiable over a network. The network may be wired, wireless, or a combination of wired and wireless. The statistics extension service presents another perspective of the date statistics extender service represented by the method 100 of the FIG. 1.

At 210, the statistics extension service accesses a data dictionary of a database to acquire date sensitive statistics for a column of a database table.

At 220, the statistics extension service determines a last date recorded in the data dictionary for the column. In an embodiment, at 221, the statistics extension service may recognize the last date as being associated with a day prior to a target date associated with a target day, where the target day represents the target date for which estimated statistics are to be generated. The target day is also at least a day prior to a current day associated with a current date.

At 230, the statistics extension service projects estimated statistics for a target date in response to statistics associated with the last date and in response to other statistics for the column associated with an interval that precedes the last date. In some cases, at 231, the statistics extension service averages statistics for the last date with the other statistics of the preceding interval. For example, if the preceding interval is a week (7 days) then statistics for the 7 days, which includes the last interval, are averaged to produce or resolve the estimated statistics. According to an embodiment, at 232, the statistics extension service may also adjust the estimated statistics by biasing them in some configurable manner, such as weighting intervals with heavy volume more than intervals with less volume before averaging, etc. Some other example biasing techniques are presented below with the sample implementation after the discussion of the FIG. 3.

At 240, the statistics extension service updates the data dictionary with the estimated statistics for the target date.

According to an embodiment, at 250, the statistics extension service may initiate a database optimizer service to develop its plans for its operations, which are to subsequently be processed against the database. The initiated database optimizer service consumes or utilizes the estimated statistics housed in the updated data dictionary.

In an embodiment, at 260, the statistics extension service may update total statistics for the column of the table within the data dictionary to include the estimated statistics produced by the statistics extension service. It is noted, that the data dictionary may, in some cases, be configured to automatically produce updated total statistics in response to the estimated statistics for the database column.

In some embodiments, at 270, the processing of the statistics extension service may be iterated with a new date. In such a situation, the new date becomes the target date and the existing target date of the prior iteration becomes the last date. This scenario was discussed above with reference to the method 100 of the FIG. 1 and may occur when the statistics extension service is producing estimated statistics for more than one date.

Figure 3:
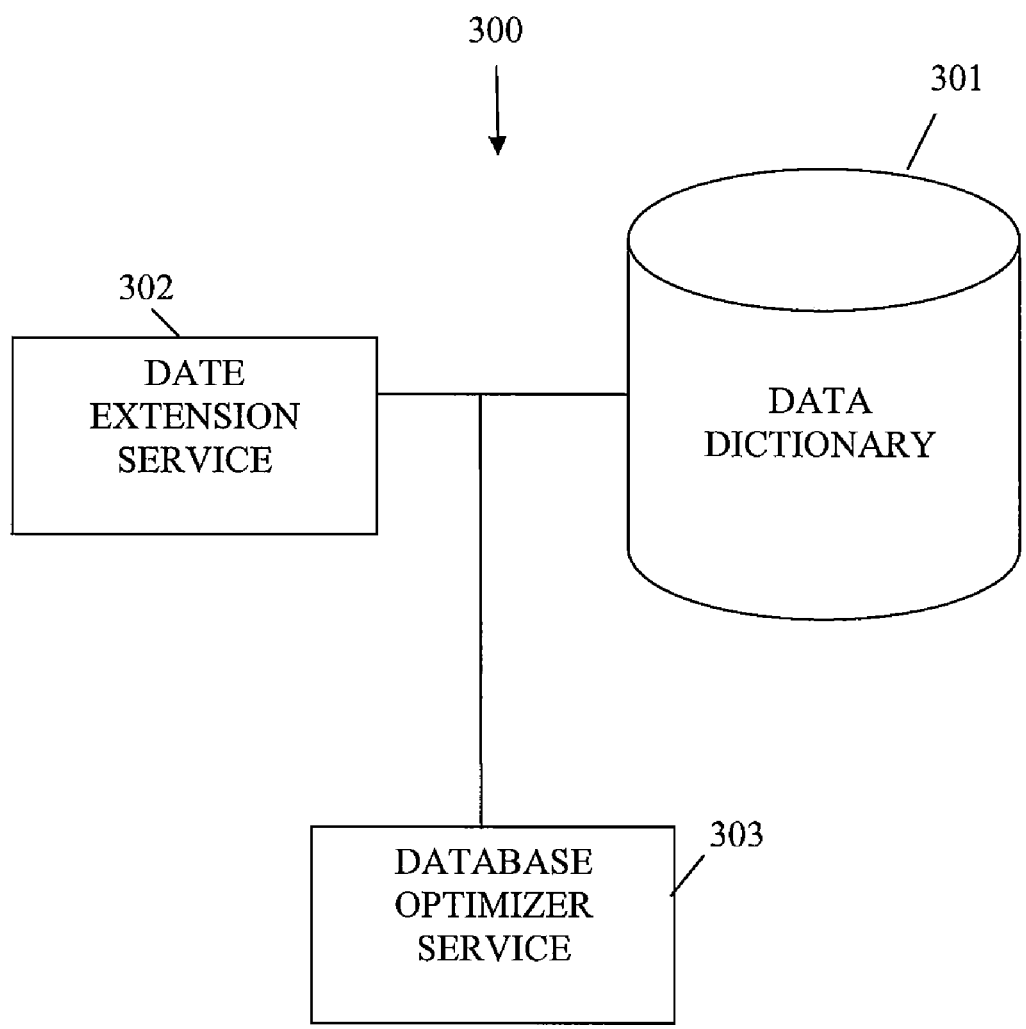
FIG. 3 is a diagram of a date statistics extender system, according to an example embodiment.

FIG. 3 is a diagram of a database statistics extender system 300, according to an example embodiment, according to an example embodiment. The database statistics extender system 300 is implemented in a machine-accessible and readable medium and is operational over a network. The network may be wired, wireless, or a combination of wired and wireless. In an embodiment, portions of the database statistics extender system 300 implements, among other things the database statistics extender service and the statistics extension service represented by the methods 100 and 200 of the FIGS. 1 and 2, respectively.

The database statistics extender system 300 includes a data dictionary 301 and a date extension service 302. The database statistics extender system 300 may also include a database optimizer service 303. Each of these and their interactions with one another will now be discussed in turn.

The data dictionary 301 is associated with a database and is in a machine-readable and accessible medium. The data dictionary 301 includes date statistics for a plurality of columns associated with a plurality of tables associated with the database. Statistics for any given column includes statistics for a variety of prior dates and are time generated and sensitive. The data dictionary 301 is populated by data gathering services and in some circumstances where estimated statistics are desired by the date extension service 302.

The date extension service 302 resides within a machine-readable and accessible medium and is processed by a machine (processing device). The date extension service 302 produces estimated statistics that are updated to the database table 301 for a desired or given target date. The date extension service 302 uses a selective number of existing statistics to produce the estimated statistics for a target date or for some subset of target intervals.

According to an embodiment, the date extension service 302 may average 3 or more days of prior statistics (acquired from the data dictionary 301) for a given column associated with a given database table, which represents statistics for a target date. The date extension service 302 may also bias the estimated statistics according to some configurable settings, such as weights, etc.

In some embodiments, the date extension service 302 may also receive as parameters the amount of prior statistics or interval for which statistics are to be averaged and used to derive the estimated statistics.

The date extension service 302 may also update total statistics for a given column once the estimated statistics are updated to the data dictionary 301.

Example processing associated with the date extension service 302 was presented in detail with respect to the methods 100 and 200 of the FIGS. 1 and 2.

According to an embodiment, the database statistics extender system 300 may also include a database optimizer service 303. The database optimizer service 303 consumes and utilizes the estimated statistics from the data dictionary 301. The database optimizer service 303 believes or assumes that the estimated statistics are actual statistics. In this manner, the database optimizer service 303 can process nearly instantaneously relying on the estimated statistics to produce plans for operations that are to be processed against the database.

The various techniques for extending date statistics have now been described in detail. A sample embodiment is provided herein and below as one example implementation. It is noted that the teachings presented herein are not limited to this particular implementation or for that matter any specific implementation.

```
REPLACE PROCEDURE ExtendDateStats
-- Extend DATE statistics for a column to CURRENT_DATE-1.
( IN dbn      VARCHAR(30) -- qualifying database name
, IN tbn      VARCHAR(30) -- qualifying table/join index/
                          -- hash index name
, IN cln      VARCHAR(30) -- column name
, OUT rc      SMALLINT    -- return code
, OUT msg     VARCHAR(256) -- message for return code
-----------------------------------------------------------------
-- To pass debug setting in as an argument, remove -- from the
-- parameter declaration below and from the SET debug = debug_in;
-- statement that occurs later in this procedure, or comment out
-- these two lines to not have this as a parameter.
-- , IN debug_in BYTEINT     -- 0; no debug
--                           1. don't execute COLLECT
--                           2: trace and execute COLLECT
--                           3: trace and don't execute
--                              COLLECT
--                           4: trace with all messages and
--                              and don't execute COLLECT
--                           For 1 to 4, COLLECT is placed
--                           in ExtendDateStats$temp$003.
-----------------------------------------------------------------
)
-----------------------------------------------------------------
-- REVISION HISTORY:
-- 01.00.00.00 Mar. 14, 2006 Initial version (tested with V2R6.0
--                           for version 2 statistics).
-- 01.00.01.00 Jul. 29, 2006 Correct some comments, msg text.
-----------------------------------------------------------------
-- WARNING: Use at your own risk. No warranty implied.
-- WARNING: This accesses and modifies a Teradata DBS internal
-- WARNING: structure (in the FieldStatistics field of a row in
-- WARNING: DBC.TVM) that is subject to change. If you upgrade to
-- WARNING: a release or backdown to a previous release that has
-- WARNING: a different statistics version than version 2, this
-- WARNING: procedure may no longer work and modifications to
-- WARNING: make it work may not be possible.
-- WARNING: Do not remove this warning.
--
-- This procedure attempts to extend the statistics for a
-- specified DATE column (database, table/join index/hash index,
-- and column name are specified as character string arguments
-- dbn, tbn, and cln, respectively). It returns a code and message
-- in rc and msg, respectively. 0 and 'Statistics for . . . ',
-- respectively, are returned if the procedure completes without
-- encountering an error. A non-zero code and corresponding message
-- are returned if the statistics are not version 2 statistics, the
-- current statistics were collected USING SAMPLE, etc.; for these
-- cases, statistics are not extended.
--
-- NOTE: This procedure may execute successfully with a Teradata
-- NOTE: success code of 0 even though this procedure did not
-- NOTE: actually extend the statistics -- you must check rc or
-- NOTE: msg to determine if the statistics were extended.
--
-- WARNING: This is not a replacement for collecting statistics.
-- WARNING: Statistics still need to be collected when they
-- WARNING: become stale. The intent of this procedure is to
-- WARNING: extend the freshness of the statistics so that
-- WARNING: statistics do not have to be collected as often.
-- WARNING: How long the freshness is extended depends on your
-- WARNING: loading patterns, workload, etc.
--
-- The statistics are extended in the last interval up to
-- CURRENT_DATE-1 as needed (that is, the max value of the last
-- interval is set to be CURRENT_DATE-1 if it is currently
-- less than CURRENT_DATE-1) and the number of rows for the last
-- interval is adjusted by adding in the current average number
-- of rows per value for the last interval to the number of
-- non-modal rows of the intervals for each day the max is
-- increased. Interval 0 is also adjusted. All new rows are
-- assumed to be not null for this column and the null count in
-- interval 0 is not adjusted.
--
-- Note: The collection date/time is updated. The existing
-- Note: statistics may have been collected either on a DATE
-- Note: column or single-column DATE index.
--
```

-continued

```
-- For example, submit the following to execute this procedure:
--
-- CALL ExtendDateStats ('pls', 't1', 'd', rc, msg);
--
-- Submit the following before and after executing this procedure
-- to check the statistics for the column being modified:
--
-- HELP STATISTICS dbn.tbn COLUMN cln;
--
-- If a problem occurs, DROP STATISTICS on the column and, if
-- desired, COLLECT STATISTICS on the column.
---------------------------------------------------------------
-- Procedure Installation and Debugging Notes:
--
-- If create/replace/execute in ANSI mode, set ANSImode to 1 below
-- For Teradata mode, set ANSImode to 0. Also, for ANSI mode, make
-- sure to commit the create/replace.
--
-- To create (or replace if not existing) this procedure, the user
-- must have CREATE PROCEDURE privilege. To replace an existing
-- version of this procedure, the user must have DROP PROCEDURE
-- privilege.
--
-- This procedure executes dynamic SQL and, therefore, the
-- creating user must be the same as the user in which the
-- procedure is created.
--
-- When creating or replacing this procedure, several warnings may
-- occur in regard to a table already exists and/or object does
-- not exist. These warnings can be ignored.
--
-- The user containing the procedure must have SELECT privilege
-- on DBC.Dbase, DBC.TVM, and DBC.TVFields, and DROP or INDEX
-- privilege on the table in order to extend the DATE statistics.
--
-- To execute this procedure, a user must have EXECUTE
PROCEDURE
-- privilege on this procedure or on the user containing this
-- procedure. Note that for the user that contains this procedure,
-- this is granted automatically when the procedure is created.
--
-- For debugging in Teradata mode, do not call this procedure
-- within a BT/ET transaction since a failure will roll back the
-- volatile tables used for tracing. For production, make sure
-- the two lines (one in parameter declarations above and one
-- below are commented out). For debugging, either uncomment those
-- two lines or set debug_default to desired value below.
---------------------------------------------------------------
BEGIN
-- Define variables corresponding to the OUT parameters rc and msg.
-- These are used since OUT parameters can only be assigned values.
-- rc and msg are set at the end of the procedure using the values
-- in the following two variables, respectively.
DECLARE rcval      SMALLINT;
DECLARE msgval     VARCHAR(256);
ExtendDateStats:
BEGIN
    DECLARE EXIT HANDLER FOR SQLSTATE '22003' BEGIN
    -- LEAVE ExtendDateStats
    -- This handler allows the continue handler below to LEAVE
    -- ExtendDatesStats when there is an error (this is to get
    -- around the restriction that a LEAVE ExtendDateStats
    -- statement is not allowed in an exception handler).
    END;
    DECLARE EXIT HANDLER FOR SQLEXCEPTION BEGIN
    -- Handle unexpected error
    SET rcval = 2001;
    SET msgval = 'Internal error: unexpected error occurred.'
        || 'SQLCODE:' || trim (BOTH FROM SQLCODE)
        || '; SQLSTATE:' || SQLSTATE || '.';
    END;
    BEGIN
    -- Configuration variables (see "Set Configuration Values" below)
    DECLARE stats_version    BYTEINT;
    DECLARE ANSImode         BYTEINT;
    DECLARE debug_default    BYTEINT;
    -- Other variables for this BEGIN/END block
    DECLARE debug        BYTEINT; -- Controls debug/tracing
    DECLARE debugid      INTEGER; -- Identity value for trace lines
```

```
    DECLARE newdate      DATE;        -- Set below to CURRENT_DATE-1
    DECLARE statbytes    VARBYTE(16383); -- Holds the statistics bytes
    DECLARE collectstmt  VARCHAR(60000); -- Build the COLLECT
statement
                         -- in this variable
    ----------------------------------------------------------------
    -- Error and trace handling
    DECLARE handle_error   SMALLINT; -- used to invoke the following
    DECLARE handle_trace   SMALLINT; -- handler
    DECLARE CONTINUE HANDLER FOR SQLSTATE '22003' BEGIN
    -- Handle errors and message tracing
    -- To invoke this handler, do the following:
    -- SET rc = handle_error+handle_trace; -- invoke handler
    IF debug >= 2 THEN
       SET debugid = debugid + 1;
    INSERT INTO ExtendDateStats$temp$0004
       VALUES (:debugid,
              CAST(ABS(:rcval) AS FORMAT '9999b') || :msgval);
    IF ANSImode = 1 THEN CALL DBC.SysExecSQL('COMMIT;'); END
IF;
    END IF;
    IF rcval > 0 THEN
       SET rc = 32767 + 1; -- LEAVE ExtendDateStats
    END IF;
    END;
    SET handle_error = 32767; -- set to cause overflow when added and
    SET handle_trace = 1; --thereby invoke above handler.
    ----------------------------------------------------------------
    -- Set Configuration Values
    -- Define the supported statistics version
    SET stats_version = 2; -- 2 is the only supported version.
    -- Define ANSI mode or not
    SET ANSImode = 0;    -- Set to 0 for Teradata mode.
                -- Set to 1 for ANSI mode.
    -- Define default debug setting
    SET debug_default = 0; -- See debug_in above in the parameter
                -- declarations for value settings.
    ----------------------------------------------------------------
    -- Establish Debug Settings
    SET debug = NULL,
    -- SET debug = debug_in; -- Comment out this line if debug_in in the
                -- parameter declarations above is commented
                -- out, or do not comment out this line if
                -- debug_in is not commented out in the
                -- parameter declarations.
    IF debug IS NULL THEN SET debug = debug_default; END IF;
    SET debugid = 0; -- Initialize debug identity for trace rows.
    ----------------------------------------------------------------
    -- Initialize newdate and collectstmt
    -- Get CURRENT_DATE once so the same value is used throughout
    -- procedure.
    SET newdate = CURRENT_DATE - 1;
    -- This procedure builds an unsupported, special form of the
    -- COLLECT STATISTICS statement which is dynamically executed.
    SET collectstmt = ''; -- Start with empty string;
    ----------------------------------------------------------------
    -- Setup trace tables for debugging
    BEGIN
    -- Drop the volatile tables used for tracing if they exist.
    DECLARE CONTINUE HANDLER FOR SQLEXCEPTION BEGIN
END;
    DROP TABLE ExtendDateStats$temp$0001;
    IF ANSImode = 1 THEN CALL DBC.SysExecSQL('COMMIT;'); END
IF;
    DROP TABLE ExtendDateStats$temp$0002;
    IF ANSImode = 1 THEN CALL DBC.SysExecSQL('COMMIT;'); END
IF;
    DROP TABLE ExtendDateStats$temp$0003;
    IF ANSImode = 1 THEN CALL DBC.SysExecSQL('COMMIT;'); END
IF;
    DROP TABLE ExtendDateStats$temp$0004;
    IF ANSImode = 1 THEN CALL DBC.SysExecSQL('COMMIT;'); END
IF;
    END;
    IF debug >= 2 THEN
    -- Table for dump of current statistics bytes (in hex and decimal)
    CREATE VOLATILE TABLE ExtendDateStats$temp$0001
        (i INTEGER, statbyte BYTE(1), statval SMALLINT)
    UNIQUE PRIMARY INDEX(i)
```

-continued

```
        ON COMMIT PRESERVE ROWS;
        IF ANSImode = 1 THEN CALL DBC.SysExecSQL('COMMIT;'); END
IF;
        -- Table for dump of current statistics as header/intervals
        CREATE VOLATILE TABLE ExtendDateStats$temp$0002
            (i        INTEGER, -- if –1, header info else interval
            minval    INTEGER, -- if id is –1, number of nulls
                    -- if high-bias interval, null
            maxval    INTEGER, -- if id is –1, number of intervals
                    -- if id is 0, null
            modeval   INTEGER, -- if id is –1, null
            modefreq  INTEGER, -- if id is –1, null
            othervals INTEGER, -- if id is –1, null
                    -- if id is 0, number of unique values
            otherrows INTEGER) -- if id is –1, null
                    -- if id is 0, total number of rows
                    --   (including rows with null)
            -- If there are no non-null rows, minval, modeval, and modefreq
            -- of interval 0 are 0. For interval 0, the number of unique
            -- values (in othervals) counts all null values as 1 unique
            -- value (that is, othervals for interval 0 will be the number
            -- of non-null unique values plus 1 1f there are nulls).
            -- The total rows (in otherrows) for interval 0 counts all rows
            -- in the table including rows with a null for this column.
            UNIQUE PRIMARY INDEX(i)
            ON COMMIT PRESERVE ROWS;
        IF ANSImode = 1 THEN CALL DBC.SysExecSQL('COMMIT;'); END
IF;
        -- Table for trace of procedure execution
        CREATE VOLATILE TABLE ExtendDateStats$temp$0004
            (i INTEGER, debuginfo VARCHAR (261))
            -- i set to debugid for inserts.
            -- debugid must be incremented by 1 before each insert.
            ON COMMIT PRESERVE ROWS;
        IF ANSImode = 1 THEN CALL DBC.SysExecSQL('COMMIT;'); END
IF;
        END IF; -- for debug
        IF debug >= 1 THEN
            -- Table for dump of non-supported, special form of COLLECT
            -- STATISTICS to extend the statistics for the DATE column/index.
            CREATE VOLATILE TABLE ExtendDate Stats$temp$0003
                (collectstmt VARCHAR(60000))
            ON COMMIT PRESERVE ROWS;
        IF ANSImode = 1 THEN CALL DBC.SysExecSQL('COMMIT;'); END
IF;
        END IF; -- for debug
        -----------------------------------------------------------------
        -- Validate IN parameters are not NULL.
        SET rcval = 1001 *
            CASE WHEN dbn IS NULL OR tbn IS NULL OR cln IS NULL
                THEN 1 ELSE –1 END;
        IF rcval > 0 OR debug = 4 THEN
            SET msgval = 'Database, table, and column name cannot be NULL.';
            SET rc = handle_error+handle_trace; -- invoke handler
        END IF;
        -----------------------------------------------------------------
        BEGIN -- Validate column exists and has DATE type and retrieve
                -- its statistics.
            DECLARE fieldtype    CHAR(2);
            DECLARE select_count INTEGER;
            BEGIN -- Retrieve data type and statistics of dbn.tbn.cln column.
                DECLARE dbnl, tbnl    VARCHAR(30);
                DECLARE EXIT HANDLER FOR SQLEXCEPTION SET rcval = -
rcval;
                SET dbnl = UPPER(dbn); -- Uppercase names to avoid issues with
                SET tbnl = UPPER(tbn); -- running in ANSI/Teradata mode.
                SET rcval = –1002;
                SELECT f.FieldType, f.FieldStatistics
                    INTO :fieldtype, :statbytes
                    FROM DBC.Dbase d, DBC.TVM t, DBC.TVFields f
                    WHERE d.DatabaseNameI = :dbnl AND t.DatabaseID =
d.DatabaseId
                    AND t.TVMNameI = :tbnl AND f.TableId = t.TVMId
                    AND f.FieldName (NOT CS) = :cln (NOT CS)
                    AND t.TableKind IN ('T', 'I', 'N');
                SET select_count = ACTIVITY_COUNT;
            END;-- Retrieve data type and statistics
            -- Validate retrieval and data type
            IF rcval > 0 OR debug = 4 THEN
```

-continued

```
        SET msgval = 'Unable to access statistics for' || dbn
            || '.' || tbn || '.' || cln || 'from DBC.TVFields.'
            || 'Immediate owner of this procedure must have'
            || 'SELECT privilege on DBC.Dbase, DBC.TVM, and'
            || 'DBC.TVFields.';
        SET rc = handle_error+handle_trace; -- invoke handler
    END IF;
    SET rcval = 1003 * CASE WHEN select_count = 0 THEN 1 ELSE -1
END;
    IF rcval > 0 OR debug = 4 THEN
        SET msgval = 'Column does not exist.';
        SET rc = handle_error+handle_trace; -- invoke handler
    END IF;
    SET rcval = 1004 * CASE WHEN fieldtype <> 'DA' THEN 1 ELSE -1
END;
    IF rcval > 0 OR debug = 4 THEN
        SET msgval = 'Column does not have DATE data type.';
        SET rc = handle_error+handle_trace -- invoke handler
    END IF;
    SET rcval = 1005 * CASE WHEN statbytes IS NULL THEN 1 ELSE -1
END;
    IF rcval > 0 OR debug = 4 THEN
        SET msgval = 'Column does not have statistics.';
        SET rc = handle_error+handle_trace; -- invoke handler
    END IF;
    END; -- Validate column and retrieve statistics
    ---------------------------------------------------------------
    BEGIN
    -- Decode current statistics and build COLLECT statement to extend
    -- statistics for DATE column.
    DECLARE numstatsbytes INTEGER;
    -- Variables to hold values from statistics header
    DECLARE numnulls      FLOAT;
    DECLARE numintervals  INTEGER;
    -- Variables hold values from statistics interval 0
    DECLARE min0          FLOAT;
    DECLARE mode0         FLOAT;
    DECLARE modefreq0     FLOAT;
    DECLARE numuniq0      FLOAT;
    DECLARE numrows0      FLOAT;
    -- Declare function parameters
    DECLARE fnc     BYTEINT; -- IN (function to execute)
    -- Parameters for fncBtoVal
    DECLARE statptr INTEGER; -- INOUT (incremented by size)
    DECLARE size    BYTEINT; -- IN (must be 1, 2, 4, or 8)
    DECLARE valint  INTEGER; -- OUT (if size 1, 2, 4)
    DECLARE valflt  FLOAT; -- OUT (if size is 8)
    -- Declare function code names
    DECLARE fncBtoVal BYTEINT; -- Convert bytes in statbytes at
            -- statptr to integer or float value.
    -- To invoke function,
    -- Set IN and INOUT parameter variables.
    -- Set fnc to desired function code name.
    -- Set fnc to functioncodename/0.
    -- Define function bodies
    DECLARE CONTINUE HANDLER FOR SQLSTATE '22012'
        CASE fnc
            WHEN fncBtoVal THEN BEGIN
            -- Convert bytes in statbytes at statptr to valint for size of
            -- 1, 2, 4, or valflt for size of 8. Statptr is incremented by
            -- size. For size 1 and 2, bytes are converted as unsigned integer
            -- (up to caller to fix if signed). For size 4, bytes are
            -- converted as signed integer (up to caller to fix if unsigned).
            -- For size 8, bytes are converted to signed float.
            DECLARE statbyte BYTE(1);
            DECLARE val0, val1, val2, val3, val4, val5, val6, val7 SMALLINT;
            DECLARE i BYTEINT;
            SET i = 0;
            WHILE i < size DO
                SET statbyte = SUBSTRING(statbytes FROM statptr FOR 1);
                SET val7 = -- convert BYTE(1) to INTEGER
                    CASE WHEN statbyte < '80'XB THEN (
                    CASE WHEN statbyte < '40'XB THEN (
                    CASE WHEN statbyte < '20'XB THEN (
                    CASE WHEN statbyte < '10'XB THEN (
                        POSITION(statbyte IN
'000102030405060708090A0B0C0D0E0F'XB)-1
                    ) ELSE (
                        POSITION(statbyte IN
```

-continued

```
'101112131415161718191A1B1C1D1E1F'XB)+15
            ) END) ELSE (
            CASE WHEN statbyte < '30XB THEN (
               POSITION(statbyte IN
'202122232425262728292A2B2C2D2E2F'XB)+31
               ) ELSE (
               POSITION(statbyte IN
'303132333435363738393A3B3C3D3E3F'XB)+47
            ) END) END) ELSE (
            CASE WHEN statbyte < '60'XB THEN (
            CASE WHEN statbyte < '50'XB THEN (
               POSITION(statbyte IN
'404142434445464748494A4B4C4D4E4F'XB)+63
               ) ELSE (
               POSITION(statbyte IN
'505152535455565758595A5B5C5D5E5F'XB)+79
            ) END) ELSE (
            CASE WHEN statbyte < '70'XB THEN (
               POSITION(statbyte IN
'606162636465666768696A6B6C6D6E6F'XB)+95
               ) ELSE (
               POSITION(statbyte IN
'707172737475767778797A7B7C7D7E7F'XB)+111
            ) END) END) END) ELSE (
            CASE WHEN statbyte < 'C0'XB THEN (
            CASE WHEN statbyte < 'A0'XB THEN (
            CASE WHEN statbyte < '90'XB THEN (
               POSITION(statbyte IN
'808182838485868788898A8B8C8D8E8F'XB)+127
               ) ELSE (
               POSITION(statbyte IN
'909192939495969798999A9B9C9D9E9F'XB)+143
            ) END) ELSE (
            CASE WHEN statbyte < 'B0'XB THEN (
               POSITION(statbyte IN
'A0A1A2A3A4A5A6A7A8A9AAABACADAEAF'XB)+159
               ) ELSE (
               POSITION(statbyte IN
'B0B1B2B3B4B5B6B7B8B9BABBBCBDBEBF'XB)+175
            ) END) END) ELSE (
            CASE WHEN statbyte < 'E0'XB THEN (
            CASE WHEN statbyte < 'D0'XB THEN (
               POSITION(statbyte IN
'C0C1C2C3C4C5C6C7C8C9CACBCCCDCECF'XB)+191
               ) ELSE (
               POSITION(statbyte IN
'D0D1D2D3D4D5D6D7D8D9DADBDCDDDEDF'XB)+207
            ) END) ELSE (
            CASE WHEN statbyte < 'F0'XB THEN (
               POSITION(statbyte IN
'E0E1E2E3E4E5E6E7E8E9EAEBECEDEEEF'XB)+223
               ) ELSE (
               POSITION(statbyte IN
'F0F1F2F3F4F5F6F7F8F9FAFBFCFDFEFF'XB)+239
            ) END) END) END) END;
         CASE i
            WHEN 0 THEN SET val0 = val7; WHEN 1 THEN SET val1 =
val7;
            WHEN 2 THEN SET val2 = val7; WHEN 3 THEN SET val3 =
val7;
            WHEN 4 THEN SET val4 = val7; WHEN 5 THEN SET val5 =
val7;
            WHEN 6 THEN SET val6 = val7; WHEN 7 THEN SET val7 =
val7;
         END CASE;
         SET statptr = statptr + 1;
           SET i = i + 1;
         END WHILE;
         CASE size -- combine size values into single value
            WHEN 1 THEN SET valint = val0;
            WHEN 2 THEN SET valint = val0 + val1*256;
            WHEN 4 THEN BEGIN
              SET valint = val0 + (val1 + (val2 +
              (val3 MOD 127)*256)*256)*256;
              IF val3 > 127 THEN BEGIN
                SET valint = valint − 2147483647;
                SET valint = valint − 1;
              END; END IF;
            END;
```

```
                WHEN 8 THEN
                    SET valflt =
                        CASE WHEN val0=0 AND val1=0 AND val2=0 AND val3=0
                            AND val4=0 AND val5=0 AND val6=0 AND val7=0
                        THEN 0
                        ELSE
                        (((((CAST((((16+(val6 MOD 16))*256+val5)*256+val4)
                            AS FLOAT)*256+
                        val3)*256+val2)*256+val1)*256+val0)
                        * 2**(((val7 MOD 128)*256+val6)/16-1023-52)
                        * CASE WHEN val7 > 127 THEN −1 ELSE 1 END)
                        END;
                    END CASE; -- combine size values into single value
                END; -- of function body for fncBtoVal
                -- define other functions - currently none
            END CASE; -- of function bodies
            -- Set values for function code names
            SET fncBtoVal = 1;
            ----------------------------------------------------------------
            ---------------------- Process statistics ----------------------
            SET numstatsbytes = BYTES(statbytes);
            SET fnc = fncBtoVal; -- set once since this is the only
                        -- function currently invoked
            IF debug >= 2 THEN
                -- Store bytes and corresponding integer values
                SET debugid = debugid + 1;
                INSERT INTO ExtendDateStats$temp$0004
                    VALUES (:debugid, 'Start processing statistics.');
                SET statptr = 1; SET size = 1;
                WHILE statptr <= numstatsbytes DO
                    SET fnc = fncBtoVal/0; -- invoke function;
                    INSERT INTO ExtendDate Stats$temp$0001
                        VALUES (:statptr − 2,
                    SUBSTRING(:statbytes FROM :statptr − 2 FOR 1),
                    :valint);
                END WHILE;
                SET debugid = debugid + 1;
                INSERT INTO ExtendDateStats$temp$0004
                    VALUES (:debugid, 'Storing converted stats bytes in table'
                        || 'ExtendDateStats$temp$0001 completed.');
            END IF; -- for debug
            ---------------------------------
            -- Process statistics header and validate
            -- Bytes 1 through 8 are the date/time the existing statistics
            -- were collected. Skip this information.
            SET statptr = 9;
            -- Validate statistics version
            SET size = 2; SET fnc = fncBtoVal/0; -- invoke function
            SET rcval = 1006 *
                CASE WHEN valint <> stats_version THEN 1 ELSE −1 END;
            IF rcval > 0 OR debug = 4 THEN
                SET msgval = 'Statistics version'
                    || TRIM(BOTH FROM CAST(valint AS CHAR(11)))
                    || 'is not supported. Statistics version must be 2.';
                SET rc = handle_error+handle_trace; -- invoke handler
            END IF;
            -- Validate Sampled flag
            SET size = 1; SET fnc = fncBtoVal/0; -- invoke function
            SET rcval = 1007 * CASE WHEN valint <> 0 THEN 1 ELSE −1 END;
            IF rcval > 0 OR debug = 4 THEN
                SET msgval = 'Extending statistics collected USING SAMPLE'
                    || 'is not supported.';
                SET rc = handle_error+handle_trace; -- invoke handler
            END IF;
            -- Validate Sampled Percent
            SET size = 1; SET fnc = fncBtoVal/0; -- invoke function
            SET rcval = 1008 * CASE WHEN valint <> 0 THEN 1 ELSE −1 END;
            IF rcval > 0 OR debug = 4 THEN
                SET msgval = 'Invalid statistics: sampled percent is non-zero'
                    || 'for statistics collected without USING SAMPLE.';
                SET rc = handle_error+handle_trace; -- invoke handler
            END IF;
            -- Get number of nulls and validate
            SET size = 8; SET fnc = fncBtoVal/0; -- invoke function
            SET numnulls = valflt;
            SET rcval = 1009 * CASE WHEN numnulls < 0 THEN 1 ELSE −1 END;
            IF rcval > 0 OR debug = 4 THEN
                SET msgval = 'Invalid statistics: number of nulls is negative.';
                SET rc = handle_error+handle_trace; -- invoke handler
```

-continued

```
    END IF;
    -- Get number of intervals and validate
    SET size = 2, SET fnc = fncBtoVal/0; -- invoke function
    SET numintervals = valint,
    SET rcval = 1010 * CASE WHEN numintervals > 110 THEN 1 ELSE −1
END;
    IF rcval > 0 OR debug = 4 THEN
        SET msgval = 'Invalid statistics: number of intervals ('
            || TRIM(BOTH FROM CAST(numintervals AS CHAR(11)))
            || ') is greater than 110.';
        SET rc = handle_error+handle_trace; -- invoke handler
    END IF;
    SET rcval = 1011 * CASE WHEN numintervals = 0 THEN 1 ELSE −1
END;
    IF rcval > 0 OR debug = 4 THEN
        SET msgval = 'Unable to extend DATE statistics when there are zero
            || 'intervals. Populate table with some non-null data for'
            || 'the DATE column and COLLECT STATISTICS on the DATE
column.';
        SET rc = handle_error+handle_trace; -- invoke handler
    END IF;
    SET rcval = 1012 *
        CASE WHEN (numintervals+1)*5*8 + 24 <> numstatsbytes
            THEN 1 ELSE −1 END;
    IF rcval > 0 OR debug = 4 THEN
        SET msgval = 'Invalid statistics: number of intervals ('
            || TRIM(BOTH FROM CAST(numintervals AS CHAR(11)))
            || ')is inconsistent with number of bytes ('
            || TRIM(BOTH FROM CAST(numstatsbytes AS CHAR(11)))
            || ') in statistics.';
        SET rc = handle_error+handle_trace; -- invoke handler
    END IF;
    -- Validate statistics are numeric
    SET size = 1; SET fnc = fncBtoVal/0; -- invoke function
    SET rcval = 1013 * CASE WHEN valint <> 1 THEN 1 ELSE −1 END;
    IF rcval > 0 OR debug = 4 THEN
        SET msgval = 'Invaild statistics: statistics are not numeric'
            || '(note that DATE is handled as a numeric type).';
        SET rc = handle_error+handle_trace; -- invoke handler
    END IF;
    -- Validate spare/alignment byte
    SET size = 1; SET fnc = fncBtoVal/0; -- invoke function
    SET rcval = 1014 * CASE WHEN valint <> 0 THEN 1 ELSE −1 END;
    IF rcval > 0 OR debug = 4 THEN
        SET msgval = 'Invalid statistics: spare byte in header is non-zero.';
        SET rc = handle_error +handle_trace; -- invoke handler
    END IF;
    IF debug >= 2 THEN
        INSERT INTO ExtendDateStats$temp$0002
            VALUES (−1, :numnulls, :numintervals, NULL, NULL, NULL,
NULL);
        SET debugid = debugid + 1;
        INSERT INTO ExtendDateStats$temp$0004
            VALUES (:debugid,
                'Statistics header retrieval and validation completed.');
    END IF; -- for debug
    ---------------------------------
    -- Process statistics interval 0 and validate
    SET size = 8; -- The rest of the values in statistics are 8-byte FLOATs.
    SET fnc = fncBtoVal/0; -- invoke function
    SET min0 = valflt;
    SET fnc = fncBtoVal/0; -- invoke function
    SET mode0 = valflt;
    SET rcval = 1015 * CASE WHEN mode0 < min0 THEN 1 ELSE −1
END;
    IF rcval > 0 OR debug = 4 THEN
        SET msgval = 'Invald statistics: the mode value for the table'
            || 'is less than the minimum value.';
        SET rc = handle_error+handle_trace; -- invoke handler
    END IF;
    SET fnc = fncBtoVal/0; -- invoke function
    SET modefreq0 = valflt;
    SET rcval = 1016 * CASE WHEN modefreq0 < 1 THEN 1 ELSE −1
END;
    IF rcval > 0 OR debug = 4 THEN
        SET msgval = 'Invalid statistics: the mode frequency for the'
            || 'table is less than 1.';
        SET rc = handle_error+handle_trace; -- invoke handler
    END IF;
```

```
    SET fnc = fncBtoVal/0; -- invoke function
    SET numuniq0 = valflt;
    SET rcval = 1017 *
        CASE WHEN numuniq0 < (CASE WHEN numnulls <> 0 THEN 1
ELSE 0 END)
        THEN 1 ELSE –1 END;
    IF rcval > 0 OR debug = 4 THEN
        SET msgval = 'Invalid statistics: number of non-null unique'
            || 'values is less than 0.';
        SET rc = handle__error+handle__trace; -- invoke handler
    END IF;
    SET rcval = 1018 *
        CASE WHEN numuniq0 < (1 + CASE WHEN numnulls <> 0 THEN 1
ELSE 0 END)
        THEN 1 ELSE –1 END;
    IF rcval > 0 OR debug = 4 THEN
        SET msgval = 'Unable to extend statistics when the number of'
            || 'non-null unique values is less than 1.';
        SET rc = handle__error+handle__trace; -- invoke handler
    END IF;
    SET fnc = fncBtoVal/0; -- invoke function
    SET numrows0 = valflt;
    SET rcval = 1019 * CASE WHEN numrows0 < numuniq0 THEN 1
ELSE –1 END;
    IF rcval > 0 OR debug = 4 THEN
        SET msgval = 'Invalid statistics: the number of rows for the'
            || 'table is less than the number of unique values.';
        SET rc = handle__error+handle__trace; -- invoke handler
    END IF;
    SET rcval = 1020 *
        CASE WHEN numrows0 < numnulls + numuniq0 – 1 THEN 1 ELSE –1
END;
    IF rcval > 0 OR debug = 4 THEN
        SET msgval = 'Invalid statistics: the number of rows for the'
            || 'table is less than the number of nulls plus the'
            || 'number of non-null unique values.';
        SET rc = handle__error+handle__trace; -- invoke handler
    END IF;
    IF debug >= 2 THEN
        INSERT INTO ExtendDateStats$temp$0002
            VALUES (0, :min0, NULL, :mode0, :modefreq0, :numuniq0,
:numrows0);
        SET debugid = debugid + 1;
        INSERT INTO ExtendDateStats$temp$0004
            VALUES (:debugid, 'Interval 0 retrieval and validation
completed.');
    END IF; -- for debug
    ---------------------------------
    -- Process statistics intervals 1 to number of intervals and validate
    BEGIN
    -- Variables to hold values from interval
    DECLARE maxval          FLOAT;
    DECLARE modeval         FLOAT;
    DECLARE modefreq        FLOAT;
    DECLARE othervals       FLOAT; -- –1 or –2 if high-bias interval;
                            -- otherwise, greater than or equal to 0.
    DECLARE otherrows       FLOAT; -- must be 0 if othervals is 0.
    -- Other variables used to process the intervals
    DECLARE minval          FLOAT;
    DECLARE totalrows       FLOAT;
    DECLARE totalvals       FLOAT;
    DECLARE firstequalheight   INTEGER;
    DECLARE i               INTEGER;
    SET firstequalheight = 0;
    SET minval = min0;
    SET i = 1;
    WHILE i <= numintervals DO
    -- Get maxval, modeval, modefreq, othervals, and otherrows
    -- for interval i.
    SET fnc = fncBtoVal/0; -- invoke function
    SET maxval = valflt;
    SET fnc = fncBtoVal/0; -- invoke function
    SET modeval = valflt;
    SET fnc = fncBtoVal/0; -- invoke function
    SET modefreq = valflt;
    SET fnc = fncBtoVal/0; -- invoke function
    SET othervals = valflt;
    SET fnc = fncBtoVal/0; -- invoke function
    SET otherrows = valflt;
```

-continued

```
    -- Validate othervals
    SET rcval = 1021 *
        CASE WHEN othervals IN (−1, −2) AND firstequalheight <> 0
        THEN 1 ELSE −1 END;
    IF rcval > 0 OR debug = 4 THEN
        SET msgval = 'Invalid statistics: high-bias intervals must'
            || 'precede equal-height intervals.';
        SET rc = handle_error+handle_trace; -- invoke handler
    END IF;
    SET rcval = 1022 *
        CASE WHEN othervals NOT IN (−1, −2) AND othervals < 0
        THEN 1 ELSE −1 END;
    IF rcval > 0 OR debug = 4 THEN
        SET msgval = 'Invalid statistics: the number of other values'
            || 'for equal-height interval'
            || TRIM(BOTH FROM CAST(i AS CHAR(11)))
            || 'is less than 0.';
        SET rc = handle_error+handle_trace; -- invoke handler
    END IF;
    IF othervals >= 0 AND firstequalheight = 0 THEN
        SET firstequalheight = i; SET minval = min0;
    END IF;
    SET totalvals = totalvals + ABS(othervals);
    -- Vaildate maxval
    SET rcval = 1023 *
        CASE WHEN (i = 1 OR i = firstequalheight) AND maxval < minval
        THEN 1 ELSE −1 END;
    IF rcval > 0 OR (debug = 4 AND 1 = 1) THEN
        SET msgval = 'Invalid statistics: the maximum value for interval'
            || TRIM(BOTH FROM CAST(i AS CHAR(11)))
            || 'is less than the minimum value.';
        SET rc = handle_error+handle_trace; -- invoke handler
    END IF;
    SET rcval = 1024 *
        CASE WHEN i <> 1 AND i <> firstequalheight AND maxval <
minval
        THEN 1 ELSE −1 END;
    IF rcval > 0 OR (debug = 4 AND (i <> 1 OR numintervals = 1))
THEN
        SET msgval = 'Invalid statistics: the maximum value for interval'
            || TRIM(BOTH FROM CAST(i AS CHAR(11)))
            || 'is not greater than the maximum value of interval'
            || TRIM(BOTH FROM CAST(i−1 AS CHAR(11))) || '.';
        SET rc = handle_error+handle_trace; -- invoke handler
    END IF;
    -- Validate modeval
    SET rcval = 1025 *
        CASE WHEN (i = 1 OR i = firstequalheight) AND modeval < minval
        THEN 1 ELSE −1 END;
    IF rcval > 0 OR (debug = 4 AND i = 1) THEN
        SET msgval = 'Invalid statistics: the mode value for interval'
            || TRIM(BOTH FROM CAST(i AS CHAR(11)))
            || 'is less than the minimum value.';
        SET rc = handle_error+handle_trace; -- invoke handler
    END IF;
    SET rcval = 1026 *
        CASE WHEN i <> 1 AND i <> firstequalheight AND modeval <
minval
        THEN 1 ELSE −1 END;
    IF rcval > 0 OR (debug = 4 AND (i <> 1 OR numintervals = 1))
THEN
        SET msgval = 'Invalid statistics: the mode value for interval'
            || TRIM(BOTH FROM CAST(i AS CHAR(11)))
            || 'is not greater than the maximum value of interval'
            || TRIM(BOTH FROM CAST(i−1 AS CHAR(11))) || '.';
        SET rc = handle_error+handle_trace; -- invoke handler
    END IF;
    SET rcval = 1027 * CASE WHEN modeval > maxval THEN 1 ELSE
−1 END;
    IF rcval > 0 OR debug = 4 THEN
        SET msgval = 'Invalid statistics: the mode value for interval'
            || TRIM(BOTH FROM CAST(i AS CHAR(11)))
            || 'is greater than the maximum value.';
        SET rc = handle_error+handle_trace; -- invoke handler
    END IF;
    -- Validate modefreq
    SET rcval = 1028 * CASE WHEN modefreq < 1 THEN 1 ELSE −1
END;
    IF rcval > 0 OR debug = 4 THEN
```

```
        SET msgval = 'Invalid statistics: the mode frequency'
            || 'for interval'
            || TRIM(BOTH FROM CAST(i AS CHAR(11)))
            || 'is less than 1.';
        SET rc = handle_error+handle_trace; -- invoke handler
    END IF;
    SET totalrows = totalrows + modefreq;
    -- Validate otherrows
    SET rcval = 1029 *
        CASE WHEN othervals > 0 AND otherrows < 1 THEN 1 ELSE -1
END;
    IF rcval > 0 OR debug = 4 THEN
        SET msgval = 'Invalid statistics: the number of other rows'
            || 'for interval' || TRIM(BOTH FROM CAST(i AS
CHAR(11)))
            || 'is less than 1 when there are other values.';
        SET rc = handle_error+handle_trace; -- invoke handler
    END IF;
    SET rcval = 1030 *
        CASE WHEN othervals = 0 AND otherrows <> 0 THEN 1 ELSE -1
END;
    IF rcval > 0 OR debug = 4 THEN
        SET msgval = 'Invalid statistics: the number of other rows'
            || 'for interval' || TRIM(BOTH FROM CAST(i AS
CHAR(11)))
            || 'is not 0 when there are no other values.';
        SET rc = handle_error+handle_trace; -- invoke handler
    END IF;
    SET rcval = 1031 *
        CASE WHEN othervals = -1
        AND (maxval <> modeval OR otherrows <> modefreq)
        THEN 1 ELSE -1 END;
    IF rcval > 0 OR debug = 4 THEN
        SET msgval = 'Invalid statistics: interval'
            || TRIM(BOTH FROM CAST(i AS CHAR(11)))
            || 'is a single-valued, high-bias interval'
            || 'but it doesn't duplicate values from mode and'
            || 'mode frequency in maximum value and other rows,'
            || 'respectively.';
        SET rc = handle_error+handle_trace; -- invoke handler
    END IF;
    SET rcval = 1032 *
        CASE WHEN othervals = -2 AND otherrows < 1 THEN 1 ELSE -1
END;
    IF rcval > 0 OR debug = 4 THEN
        SET msgval = 'Invalid statistics: interval'
            || TRIM(BOTH FROM CAST(i AS CHAR(11)))
            || 'is a two-valued, high-bias interval'
            || 'but the number of rows for the second value'
            || 'is less than 1.';
        SET rc = handle_error+handle_trace; -- invoke handler
    END IF;
    IF othervals <> -1 THEN
        SET totalrows = totalrows + otherrows;
    END IF;
    IF debug >= 2 THEN
        INSERT INTO ExtendDateStats$temp$0002
        VALUES (:i,
            CASE WHEN :firstequalheight = 0
                THEN NULL
                ELSE :minval END,
            :maxval, :modeval, :modefreq,
            :othervals, :otherrows);
        SET debugid = debugid + 1;
        INSERT INTO ExtendDateStats$temp$0004
        VALUES (:debugid,
            'Interval' || TRIM(BOTH FROM CAST(:i AS CHAR(11)))
            || 'retrieval and validation completed.');
    END IF; -- for debug
    IF i = numintervals THEN BEGIN
        DECLARE highvals    FLOAT;
        DECLARE highrows    FLOAT;
        DECLARE newrows     FLOAT;
        DECLARE numdays     INTEGER;
        IF debug >= 2 THEN
            SET debugid = debugid + 1;
            INSERT INTO ExtendDateStats$temp$0004
            VALUES (:debugid, 'Storing header and intervals in table'
                || 'ExtendDateStats$temp$0002 completed.');
```

```
END IF; -- for debug
SET highvals = 0;
SET highrows = 0;
IF firstequalheight > 1 THEN BEGIN
-- Re-process high-bias intervals (from highest to lowest) to
-- find ones with within or beyond the last equal-height interval.
DECLARE maxvalh      FLOAT;
DECLARE modevalh     FLOAT;
DECLARE modefreqh    FLOAT;
DECLARE othervalsh   FLOAT;
DECLARE otherrowsh   FLOAT;
SET statptr = firstequalheight*40 + 25 − 40;
highbias:
WHILE statptr >= 65 DO
-- Get maxvalh, modevalh, modefreqh, othervalsh, and otherrowsh
-- for this high-bias interval.
SET fnc = fncBtoVal/0; -- invoke function
SET maxvalh = valflt;
IF maxvalh < minval THEN LEAVE highbias; END IF;
SET fnc = fncBtoVal/0; -- invoke function
SET modevalh = valflt;
SET fhc = fncBtoVal/0; -- invoke function
SET modefreqh = valflt;
SET fnc = fncBtoVal/0; -- invoke function
SET othervaish = valflt;
SET fnc = fncBtoVal/0; -- invoke function
SET otherrowsh = valflt;
IF debug >= 2 THEN BEGIN
-- Validate that these are the same values as picked
-- up first time.
DECLARE maxvalj      FLOAT;
DECLARE modevalj     FLOAT;
DECLARE modefreqj    FLOAT;
DECLARE othervalsj   FLOAT;
DECLARE otherrowsj   FLOAT;
DECLARE j            INTEGER;
SET j = (statptr − 25 − 40)/40;
SELECT maxval, modeval, modefreq, othervals, otherrows
   INTO :maxvalj, :modevalj, :modefreqj, :othervalsj, :otherrowsj
   FROM ExtendDateStats$temp$0002
   WHERE i = :j;
SET rcval = 1033 *
CASE
   WHEN maxvalh <> maxvalj OR modevalh <> modevalj OR
      modefreqh <> modefreqj OR othervalsh <> othervalsj OR
      otherrowsh <> otherrowsj
   THEN 1 ELSE −1 END;
IF rcval > 0 OR debug = 4 THEN
   SET msgval = 'Internal error: mismatch on rescan of'
      || 'high-bias interval'
      || TRIM(BOTH FROM CAST(j AS CHAR(11))) || '.';
   SET rc = handle_error+handle_trace; -- invoke handler
END IF;
SET debugid = debugid + 1;
INSERT INTO ExtendDateStats$temp$0004
   VALUES (:debugid,
      'Retrieved high-bias interval'
      || TRIM(BOTH FROM CAST(:j AS CHAR(11)))
      || 'with values greater than or equal to'
      || 'minimum of last equal-height interval.');
END; END IF; -- for debug
IF maxvalh > maxval THEN SET maxval = maxvalh; END IF;
SET highrows = highrows + otherrowsh;
SET highvals = highvals + 1;
IF othervalsh = −2 AND modevalh >= minval THEN
   SET highrows = highrows + modefreqh;
   SET highvals = highvals + 1;
END IF;
SET statptr = statptr − 80; -- backup to preceding interval
END WHILE highbias;
END; END IF,
IF debug >= 2 THEN
   SET debugid = debugid + 1;
   INSERT INTO ExtendDateStats$temp$0004
      VALUES (:debugid,
         'There are'
         || TRIM(BOTH FROM
```

```
                CAST(:highrows AS DECIMAL(18,0) FORMAT'-
(18)9V'))
            || 'rows and'
            || TRIM(BOTH FROM
                CAST(:highvals AS DECIMAL(18,0) FORMAT'-
(18)9V'))
            || 'values for high-bias intervals with values'
            || 'greater than or equal to minimum of last'
            || 'equal-height interval.');
        END IF;
        -- Validate that statistics need updating for last interval
        SET rcval = 1034 *
            CASE WHEN CAST(maxval AS DATE) = newdate THEN 1
ELSE −1 END;
        IF rcval > 0 OR debug = 4 THEN
            SET msgval = 'Statistics are already up to date.';
            SET rc = handle_error+handle_trace; -- invoke handler
        END IF;
        SET rcval = 1035 *
            CASE WHEN CAST(maxval AS DATE) > newdate THEN 1 ELSE
−1 END;
        IF rcval >0 OR debug = 4 THEN
            SET msgval = 'Statistics are already beyond'
                || trim (cast(newdate as FORMAT 'mmmmbdd,byyyy')) || '.';
            SET rc = handle_error+handle_trace; -- invoke handler
        END IF;
        SET numdays = newdate − CAST(maxval AS DATE);
        IF debug >= 2 THEN
            SET debugid = debugid + 1;
            INSERT INTO ExtendDate Stats$temp$0004
            VALUES (:debugid,
                'Old last interval: maxval is'
                || TRIM(BOTH FROM
                    CAST(:maxval AS DECIMA (18,0) FORMAT'-
(18)9V'))
                || ', modeval is'
                || TRIM(BOTH FROM
                    CAST(:modeval AS DECIMAL(18,0) FORMAT'-
(18)9V'))
                || ', modefreq'
                || TRIM(BOTH FROM
                    CAST(:modefreq AS DECIMAL(18,0) FORMAT'-
(18)9V'))
                || ',othervals is'
                || TRIM(BOTH FROM
                    CAST(:othervals AS DECIMAL(18,0) FORMAT'-
(18)9V'))
                || ',otherrows is'
                || TRIM(BOTH FROM
                    CAST(:otherrows AS DECIMAL(18,0) FORMAT'-
(18)9V'))
                || '. Old number of unique values is'
                || TRIM(BOTH FROM
                    CAST(:numuniq0 AS DECIMAL(18,0) FORMAT'-
(18)9V'))
                || '. Old total rows is'
                || TRIM(BOTH FROM
                    CAST(:numrows0 AS DECIMAL(18,0) FORMAT'-
(18)9V'))
                || '. Extend by'
                || TRIM(BOTH FROM
                    CAST(:numdays AS DECIMAL(18,0) FORMAT'-
(18)9V'))
                || 'day'
                || CASE numdays WHEN 1 THEN '.' ELSE 's.' END);
        END IF; -- for debug
        SET numuniq0 = numuniq0 + numdays;
        -- Determine updates for last interval
        IF othervals = −1 THEN
        -- Handle high-bias interval with one value by
        -- changing it to be a two-valued, high-bias interval
        -- for one additional day and then drop into handling
        -- for a two-valued, high-bias interval to handle
        -- any additional days.
            SET maxval = CAST(maxval AS DATE) + INTERVAL '1' DAY;
            SET othervals = −2;
            SET numrows0 = numrows0 + otherrows;
            SET numdays = numdays − 1;
            IF debug >= 2 THEN
```

-continued

```
        SET debugid = debugid + 1;
        INSERT INTO ExtendDate Stats$temp$0004
        VALUES (:debugid,
            'Last interval is a one-valued, high-bias'
            || 'interval -- change to two-valued');
        END IF; -- for debug
    END IF;
    IF othervals = −2 THEN
        IF numdays > 0 THEN
        -- Handle high-bias interval with two values
        -- by changing it to be an equal-height interval.
        IF modefreq < otherrows THEN
        SET mode val = maxval:
        SET newrows = modefreq;
        SET modefreq = otherrows;
        SET otherrows = newrows;
        END IF;
        SET newrows =
            CAST((((otherrows + mode freq)/2) * numdays)
            AS DECIMAL(18,0));
        IF debug >= 2 THEN
            SET debugid = debugid + 1;
            INSERT INTO ExtendDateStats$temp$0004
            VALUES (:debugid,
                'Number of new rows for last interval is'
                || TRIM(BOTH FROM
                    CAST(:newrows AS
                        DECIMAL(18,0) FORMAT '-(18)9V'))
                || '. This interval is a two-valued, high-bias'
                || 'interval.');
        END IF; -- for debug
        SET otherrows = otherrows + newrows;
        SET othervals = 1 + numdays;
        SET numrows0 = numrows0 + newrows;
        END IF;
    ELSE -- Handle equal-height interval
        SET newrows =
        CAST(((otherrows + mode freq + highrows)/
        (othervals + 1 + highvals) * numdays)
        AS DECIMAL(18,0));
    IF (otherrows + newrows)/(othervals + numdays) > modefreq
THEN
        IF debug >= 2 THEN
        SET debugid = debugid + 1;
        INSERT INTO ExtendDateStats$temp$0004
        VALUES (:debugid,
            'Number of new rows ('
            || TRIM(BOTH FROM
                CAST(:newrows AS
                    DECIMAL(18,0) FORMAT'-(18)9V'))
            || ') needs to be capped (average rows per other'
            || 'values would exceed mode freq).');
        END IF;
        SET newrows = mode freq * (othervals + numdays) − otherrows;
    END IF;
    IF debug >= 2 THEN
        SET debugid = debugid + 1;
        INSERT INTO ExtendDate Stats$temp$0004
        VALUES (:debugid,
            'Number of new rows for last interval is'
            || TRIM(BOTH FROM
                CAST(:newrows AS DECIMAL(18,0) FORMAT'-
(18)9V'))
            || '. This interval is an equal-height interval.');
        END IF; -- for debug
        SET otherrows = otherrows + newrows;
        SET othervals = othervals + numdays;
        SET numrows0 = numrows0 + newrows;
    END IF;
    SET maxval = CAST(maxval AS DATE) + numdays;
    IF debug >= 2 THEN
        SET debugid = debugid + 1;
        INSERT INTO ExtendDateStats$temp$0004
        VALUES (:debugid,
            'New last interval: maxval is'
            || TRIM(BOTH FROM
                CAST(:maxval AS DECIMAL(18,0) FORMAT'-
(18)9V'))
            || ', modeval is'
```

-continued

```
        || TRIM (BOTH FROM
            CAST(:modeval AS DECIMAL(18,0) FORMAT'-
(18)9V'))
        || ', mode freq is'
        || TRIM (BOTH FROM
            CAST(:modefreq AS DECIMAL(18,0) FORMAT'-
(18)9V'))
        || ', othervals is'
        || TRIM(BOTH FROM
            CAST(:othervals AS DECIMAL(18,0) FORMAT'-
(18)9V'))
        || ', otherrows is'
        || TRIM(BOTH FROM
            CAST(:otherrows AS DECIMAL(18,0) FORMAT'-
(18)9V'))
        || '. New number of unique values is'
        || TRIM(BOTH FROM
            CAST(:numuniq0 AS DECIMAL(18,0) FORMAT'-
(18)9V'))
        || '. New total rows is'
        || TRIM(BOTH FROM
            CAST(:numrows0 AS DECIMAL(18,0) FORMAT'-
(18)9V'))
        || '.');
      END IF; -- for debug
    END; END IF; -- End validate and determine updates for last
interval
      SET collectstmt =
        collectstmt || ','
        || TRIM(BOTH FROM CAST(maxval AS INTEGER)) || ','
        || TRIM(BOTH FROM CAST(modeval AS INTEGER)) || ','
        || TRIM(BOTH FROM
            CAST(modefreq AS DECIMAL(18,0) FORMAT'-(18,)9V')) || ','
        || TRIM(BOTH FROM
            CAST(othervals AS DECIMAL(18,0) FORMAT'-(18)9V')) || ','
        || TRIM(BOTH FROM
            CAST(otherrows AS DECIMAL(18,0) FORMAT'-(18)9V'));
      SET minval = CAST(maxval AS DATE) + 1;
      SET i = i + 1;
    END WHILE; -- through intervals 1 to number of intervals
    END; -- Get intervals 1 to number of intervals and validate
    ---------------------------------
    -- Finalize COLLECT statement
    SET collectstmt =
        'COLLECT STATISTICS ON' || dbn || '.' || tbn
        || 'COLUMN' || cln
        || 'VALUES ('
        || TRIM(BOTH FROM
            CAST(numnulls AS DECIMAL(18,0) FORMAT '-(18)9V')) || ','
        || TRIM(BOTH FROM numintervals) || ','
        || TRIM(BOTH FROM
            CAST(min0 AS DECIMAL(18,0) FORMAT'-(18)9V')) || ','
        || TRIM (BOTH FROM
            CAST(mode0 AS DECIMAL(18,0) FORMAT '-(18)9V')) || ','
        || TRIM BOTH FROM
            CAST(modefreq0 AS DECIMAL(18,0) FORMAT '-(18)9V')) || ','
        || TRIM(BOTH FROM
            CAST(numuniq0 AS DECIMAL(18,0) FORMAT '-(18)9V')) || ','
        || TRIM(BOTH FROM
            CAST(numrows0 AS DECIMAL(18,0) FORMAT '-(18)9V'))
        || TRIM(collectstmt) || ');';
    END; -- of decoding statistics and building COLLECT STATISTICS
statement
    ----------------------------------------------------------------
    -- Finish up
    IF debug >= 1 THEN
      INSERT INTO ExtendDateStats$temp$0003 VALUES (:collectstmt);
      IF debug >= 2 THEN
        SET debugid = debugid + 1;
        INSERT INTO ExtendDateStats$temp$0004
        VALUES (:debugid,
            'Building of COLLECT STATISTICS statement completed.');
      END IF;
    END IF; -- for debug
    IF debug IN (0, 2) THEN -- extend the statistics (execute the
COLLECT)
      BEGIN
        DECLARE CONTINUE HANDLER FOR SQLEXCEPTION SET rcval =
-rcval;
```

-continued

```
        SET rcval = -1036;
        CALL DBC.SysExecSQL (:collectstmt);
        IF ANSImode = 1 THEN CALL DBC.SysExecSQL('COMMIT;'); END
IF;
    END;
END IF; -- extend the statistics (execute the COLLECT)
IF rcval > 0 OR debug = 4 THEN
    SET msgval = 'Unable to COLLECT STATISTICS for'
        || dbn || '.' || tbn || '.' || cln
        || 'to extend DATE statistics. Verify user'
        || 'containing procedure has DROP or INDEX'
        || 'privilege on the table.';
    SET rc = handle_error+handle_trace; -- invoke handler
END IF;
IF debug IN (0, 2, 4) THEN
    -- Return successfully extended DATE statistics.
    SET rcval = 0;
    SET msgval = 'Statistics for'
        || dbn || '.' || tbn || '.' || cln
        || 'extended to'
        || trim(cast(newdate as FORMAT 'mmmmbdd,byyyy')) || '.';
    SET rc = handle_error+handle_trace; -- invoke handler
END IF;
IF debug NOT IN (0, 2) THEN
    -- Return COLLECT STATISTICS statement to extend DATE
    -- statistics inserted in table ExtendDateStats$temp$0003.
    SET rcval = 1;
    SET msgval = 'COLLECT STATISTICS statement for'
        || dbn || '.' || tbn || '.' || cln
        || 'to extend DATE statistics to'
        || trim (cast (newdate as FORMAT 'mmmmbdd,byyyy'))
        || 'inserted into table ExtendDateStats$temp$0003.';
    SET rc = handle_error+handle_trace; -- invoke handler
END IF;
----------------------------------------------------------------
END; END ExtendDateStats;
SET rc = rcval; SET msg = msgval;
END;
                    © 2006 NCR Corporation, Dayton, Ohio
```

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable medium and executed by a process device for performing the method, comprising:

receiving a request to extend date statistics for a date column of a table, wherein a data dictionary associated with a database includes existing date statistics for the date column;

determining a last day when the existing date statistics were last updated for the date column in the data dictionary;

retrieving the existing date statistics from the data dictionary and validating selective information associated with the existing date statistics; and projecting estimated date statistics from the existing date statistics for the days between the last day up until a day previous to a current day.

2. The method of claim 1 further comprising, biasing the estimated date statistics.

3. The method of claim 1, wherein retrieving further includes extrapolating a last interval for which the existing date statistics were recorded for the date column in the data dictionary.

4. The method of claim 3, wherein projecting further includes averaging the existing date statistics for the last interval to acquire the estimated date statistics.

5. The method of claim 1, wherein projecting further includes supplying the estimated date statistics as current statistics for use by other services.

6. The method of claim 1 further comprising, updating the data dictionary with the estimated date statistics.

7. The method of claim 6, wherein updating further supplying the estimated date statistics to a database optimizer service via the updated data dictionary.

8. A method implemented in a computer-readable medium and executed by a processing device for performing the method, comprising:

accessing a data dictionary of a database to acquire date sensitive statistics for a column of a database table;

determining a last date recorded for the date sensitive statistics in the data dictionary;

projecting estimated statistics for a target date in response to the date sensitive statistics of the last date and based on an interval of days that precedes the last date and which includes other date sensitive statistics for the column; and updating the data dictionary with the estimated statistics for the target date.

9. The method of claim 8 further comprising, initiating a database optimizer service to develop plans for operations that are to be processed against the database and providing the updated data dictionary having the estimated statistics for the target date.

10. The method of claim 8, wherein determining the last date further includes recognizing the last date as a day associated with being at least one day prior to a target day associated with the target date, and wherein the target day is at least one day prior to a current day.

11. The method of claim 8, wherein projecting further includes averaging the date sensitive statistics of the last day with the other date sensitive statistics of the interval to resolve the estimated statistics for the target date.

12. The method of claim 8, wherein projecting further includes biasing the estimated statistics for the target date.

13. The method of claim 8 further comprising, updating total statistics for the column within the data dictionary.

14. The method of claim 8 further comprising, iterating the processing of the the method for a new date, wherein the target date becomes the last date and the new date becomes the target date.

* * * * *